Aug. 27, 1929.   J. V. GIESLER   1,726,483
EXPANSION JOINT
Filed March 19, 1923   2 Sheets-Sheet 1

Inventor
Jean V. Giesler
BY
Mauro Cameron, Lewis
& Kirkam
Attorneys

Aug. 27, 1929.     J. V. GIESLER     1,726,483
EXPANSION JOINT
Filed March 19, 1923     2 Sheets-Sheet 2
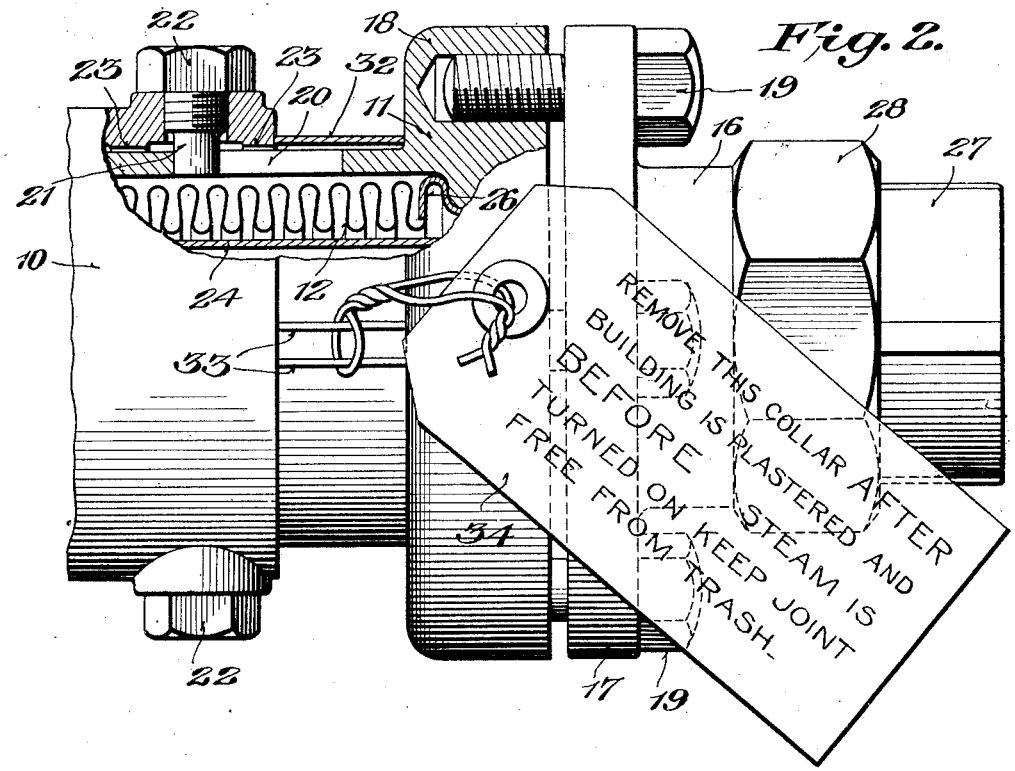
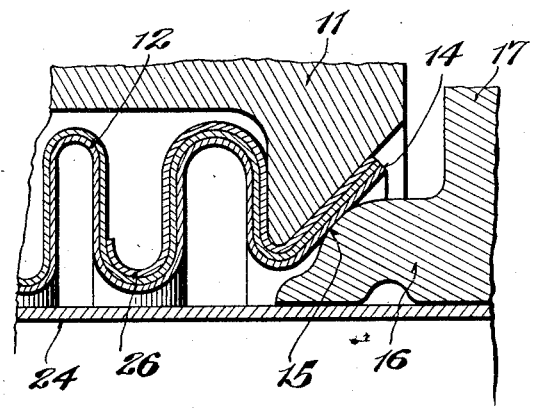
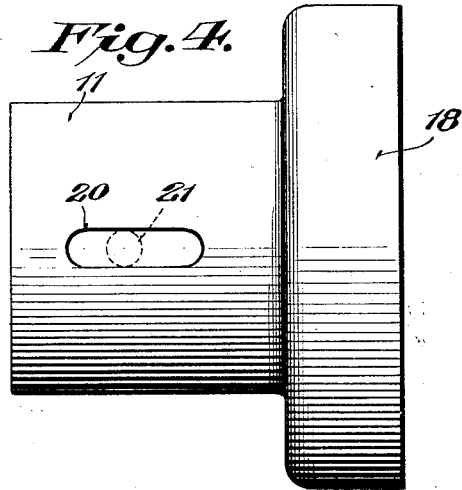

Patented Aug. 27, 1929.

1,726,483

UNITED STATES PATENT OFFICE.

JEAN V. GIESLER, OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE.

EXPANSION JOINT.

Application filed March 19, 1923. Serial No. 626,189.

This invention relates to expansion joints for taking care of the variations in the length of pipe lines which accompany changes in the temperature of the same and, more particularly, to expansion joints of the type employing an expansible and collapsible wall for maintaining a fluid-tight joint or connection between the relatively movable parts of such an expansion joint.

It has heretofore been proposed to provide an expansion joint including a pair of tubular members adapted to have relative movement in the direction of their axes and an expansible and collapsible wall secured to said members to form fluid-tight joints therewith and, to prevent independent rotation of said members and to guide said members in their movements toward and from each other, it has also been proposed to provide flanges on said members and connect said flanges by long screw bolts extending through apertures in said flanges, nuts sometimes being provided on said bolts on either side of said flanges to limit the extent to which said members may approach toward and recede from each other. If the expansible and collapsible wall employed in such an expansion joint is of relatively thin corrugated metal, however, it is likely to be seriously injured when installing the joint in a pipe line so that, if the expansible and collapsible wall is not actually ruptured at that time, it is liable to fail after a short period of use, because walls of this character, while relatively strong and durable so long as they are subjected to forces of expansion and compression, are readily injured by being stressed beyond their elastic limit if they are subjected to substantial twisting forces or torsional stresses. In the heretofore proposed structures described above, not only has no effort been made, so far as I am aware, to prevent play between the bolts and the apertures in the flanges through which they pass, but the length of these bolts is such that they will give under the rotational forces usually employed in installing an expansion joint in a pipe line and therefore permit severe torsional or twisting stresses to be exerted on the opposite ends of the collapsible and expansible wall.

It has also been proposed to provide the relatively movable members of an expansion joint of the type under consideration with mating tenons and slots to prevent independent rotation of said members, one or both of these mating parts being commonly tapered. Here again, however, said members are capable of some rotational movement, though slight, relatively to each other, particularly where one or both of the mating parts are tapered, so that the forces exerted on said members in installing the joint in a pipe line are likely to stress the expansible and collapsible wall unduly. Other methods of preventing independent rotation of the relatively movable members of expansion joints have also been suggested, but all of these, so far as I am aware are open to the grave objection that the expansible and collapsible walls are likely to be subjected to torsional stresses when the joints are put in use.

It is an object of this invention to provide an expansion joint, employing an expansible and collapsible wall forming fluid-tight joints with relatively movable members, with means to prevent the exertion of torsional stresses on said wall.

Another object of this invention is to provide an expansion joint of the type characterized with telescopically movable members with which the expansible and collapsible wall forms fluid-tight joints and with cooperating means on the overlapping ends of said members to insure against the relative twisting of said members and thereby prevent the exertion of twisting forces on said wall.

Another object of this invention is to provide an expansion joint employing an expansible and collapsible wall forming fluid-tight joints with relatively movable tubular members, which preferably telescope one within the other and which also preferably form a housing for said wall, with improved means for guiding the relative movement of said members and limiting the extent of their movement.

Another object of the present invention is to provide an expansion joint employing an expansible and collapsible wall forming fluid-tight joints with relatively movable members with means for preventing flexure of said wall where said wall is joined to said members so as to avoid regions of excess strain at or adjacent the junctions of said wall with said members.

Another object of this invention is to provide as an article of maufacture an expansion joint including an expansible and collapsible wall forming fluid-tight joints with relatively movable members and a removable element between said members for holding said wall expanded until the joint has been installed in the pipe line, so as to avoid the danger of the joint being installed in its collapsed condition with the consequent lack of provision for further collapse upon rise in the temperature of the pipe line.

Another object of this invention is to provide as an article of manufacture an expansion joint of the type referred to wherein the relatively movable members telescope one within the other, with means for protecting the telescoping surfaces of said members during the installation of the joint, so as to prevent foreign matter from getting between said surfaces and impairing the operation of the joint.

Another object of this invention is to provide as an article of manufacture an expansion joint of the type referred to with tail pieces at either end of the joint so that in installing or removing the joint no occasion need arise for separating the parts of the joint and destroying the fluid-tight connections therein.

Other objects of this invention relate to the provision of an expansion joint employing an expansible and collapsible wall between relatively movable members which is simple and inexpensive to construct, has a minimum number of parts, is easy to install and remove, and is strong and durable in use.

The invention is capable of receiving a variety of mechanical expressions one of which has been shown on the accompanying drawings, but it is to be expressly understood that the drawings are for purposes of illustration only and are not to be construed as a definition of the limits of the invention, reference being had to the appended claims for that purpose.

Referring in detail to said drawings wherein the same reference characters designate corresponding parts in the several figures:—

Fig. 2 is a fragmentary axial section illustrating the pipe joint as it is delivered to the consumer and installed;

Fig. 3 is an enlarged fragmentary axial section illustrating the reinforcement of an end of the expansible and collapsible wall, and Fig. 4 is a plan view of one of the relatively movable members to illustrate the pin and slot connection between said members.

Figure 1:
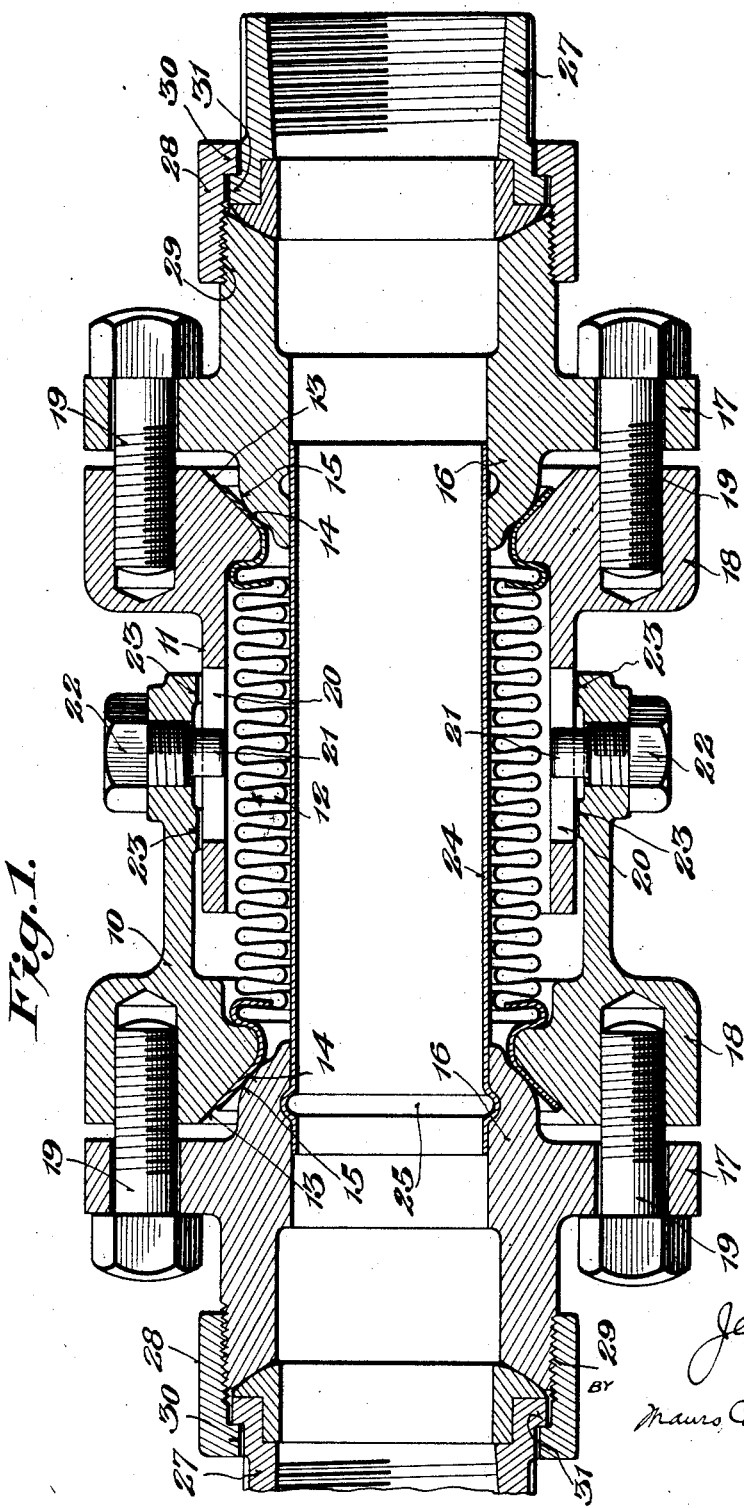
Fig. 1 is an axial section of an expansion joint embodying the present invention.

In the form shown, the expansion joint includes a pair of relatively movable tubular members 10 and 11 adapted to have relative movement in the direction of their axes and preferably constructed so that one of said members, as 11, may telescope within the other of said members, as 10. Connected at its opposite ends to said members 10 and 11, and preferably within the same so that said members form a housing therefor, is an expansible and collapsible wall 12 of any suitable construction, but preferably formed of deeply corrugated metal, such as copper or brass. This expansible and collapsible wall 12 is connected to said members 10 and 11 in any suitable way so as to form fluid-tight joints therewith. In the structure illustrated, the members 10 and 11 are provided with outwardly flared axial openings 13, and the ends 14 of the expansible and collapsible wall are fixedly clamped between said outwardly flared surfaces and the inwardly tapered or curved surfaces 15 of end members or collars 16 secured to the telescopic members 10 and 11. These end members 16 may be attached to the members 10 and 11 in any suitable way, the former being shown as provided with flanges 17 and the latter with flanges 18 so that the collars 16 may be rigidly secured to the members 10 and 11, and their inwardly tapered or curved surfaces 15 force the ends 14 of the wall 12 into firm clamping engagement with the members 10 and 11, by a suitable number of bolts or cap screws 19 passing through or into aligned apertures in said flanges.

The end members or collars 16 of this expansion joint are adapted to be connected to pipe ends and as the installing of the joint so as to form suitable fluid-tight connections between the collars 16 and the pipe ends would be accompanied by a tendency to rotate the members 10 and 11 with respect to each other, with the consequent imposition of severe torsional stresses on the expansible and collapsible wall 12, suitable means are employed to prevent the exertion of twisting forces on the wall 12, such means being preferably provided between the overlapping ends of the telescopic members 10 and 11. In the form shown, the member 11 is provided with a suitable number, preferably two, elongated slots 20, and the member 10 is provided with a corresponding number of pins 21 which have a close sliding fit in the slots 20, these pins being preferably provided as reduced ends of cap screws 22 threaded into suitable apertures in the member 10. As the pins 21 have a close sliding fit in the slots 20, no rotational movement of the members 10 and 11 with respect to each other is permitted and, therefore, these members cannot be twisted with respect to each other to exert a torsional stress on the wall 12. Moreover the pin and slot connections 20, 21 between the members 10 and 11 not only constitute a means for guiding the telescopic movement of said members, but the slots 20 are also preferably made of such length as to cooperate with the pins 21 in limiting the extent of relative movement of said members in one or both directions.

To prevent binding or seizing of the telescoping members 10 and 11, one of these members is preferably provided with a pair of spaced annular bearing surfaces 23 for engagement with the other of said members. As these surfaces are spaced a considerable distance in the direction of the axes of the members 10 and 11, they guide the relative movement of these members so as to insure against the binding of the parts in the event that the forces acting to expand and contract the joint are not in exact alignment with the axis of the joint. If desired a tubular section 24 may be suitably secured to one of the end members 16, as by expanding the same into a groove 25 in said end member, and project into the other of said end members so as to slide back and forth therein as the joint expands and contracts.

In order to prevent a localizing of stresses at the lines of engagement of the end members 16 with the ends 14 of the expansible and collapsible wall, said wall is preferably reinforced at its ends so that the flexing of the wall will take place in the corrugations constituting the intermediate portion of said wall. Such reinforcement is shown in exaggerated form in Fig. 1, and in more detail in Fig. 3. In the latter figure the expansible and collapsible wall is shown as composed of two-ply corrugated metal and a reinforcing member 26 is applied to the end portion and end corrugation of this wall so as to stiffen said wall at and adjacent the junction of said wall with the telescopic members 10 and 11. This reinforcement may be provided in any suitable way, a tubular section of metal, of suitable width and thickness, preferably being applied to the drawn metal tubing prior to the formation of corrugations therein and then corrugated with the wall of which it is to form a part so as to be securely and intimately locked thereto. In the structure illustrated the wall is laminated throughout, being made of two-ply metal with end sections provided with a third ply, but it is to be expressly understood that when suitable the main portion of the wall may be made of single ply, or more than two ply, and the end sections may have one or more laminations in excess of the intermediate portion of the wall.

While the end members 16 may be formed for direct attachment to the pipe ends, tail pieces 27 are preferably suitably mounted on the end members 16 so as to form a part of the expansion joint as it is manufactured and sold. The tail pieces 27 may be secured to the end members 16 in any suitable way, as by the use of collars 28 which cooperate with threads 29 on the end members 16 and are provided with flanges 30 for engagement with flanges 31 on the tail pieces 27, said tail pieces being threaded or otherwise suitably formed for attachment to the pipe ends. The provision of these tail pieces eliminates the necessity, when installing or removing the joint, of ever disconnecting the end members 16 from the members 10 and 11 and the consequent breaking of the fluid-tight joints between the flexible wall 12 and said members 10 and 11, since, in case of need, the flanged collars 28 may be removed from the end members 16 so as to free the body of the expansion joint.

When expansion joints are installed in the pipe lines of heating systems, they should ordinarily be in expanded condition, because, being installed when the pipes are cold, they must provide for the subsequent expansion of the pipes upon their rise in temperature when the heating fluid is flowing through the same—whereas if the joint were installed in collapsed condition there would be no adequate provision for the subsequent expansion of the pipe. To insure that the joint as installed is properly expanded, removable means are preferably provided as a part of the article of manufacture, as sold and delivered to the consumer, to hold the wall 12 suitably expanded and the relatively telescopic members 10 and 11 suitably extended. In the form shown a split collar 32 of any suitable material, such as sheet metal, is interposed between the member 10 and 11, as shown in Fig. 2, said collar being provided with flanges 33 which may be suitably wired together to hold the collar in position until the joint has been installed in the pipe line. Collar 32 may be of any suitable width, being shown as adapted to hold the joint in its fully expanded position. It will be understood, however, that the collar 32 may be made of less width if the joint is to be installed in a line wherein provision must be made for subsequent expansion as well as contraction of the joint. Collar 32 is also preferably so constructed as to constitute a protecting cover for the telescoping surfaces of the members 10 and 11. Expansion joints of the type under consideration are generally installed in buildings before the construction work is finished, usually before the plastering is done, and there is danger that plaster or other dirt will get onto the relatively telescoping surfaces and interfere with their free and efficient movement. By providing a protecting covering as heretofore described, however, foreign matter may be excluded from these telescoping surfaces until the constructional work is completed. Moreover, the telescoping surfaces may be provided with a heavy grease at the factory to provide for their lubrication when properly protected as shown. A tag, as illustrated at 34, may be attached to the collar 32 to give suitable instructions concerning the time and manner of removing the same.

It will therefore be perceived that an expansion joint of the type employing an expansible and collapsible wall forming fluid-tight joints with relatively movable members has been so constructed as to insure against the exertion of torsional stresses on said wall; also one wherein said expansible and collapsible wall is protected within a housing composed of relatively telescopic members which are suitably guided and limited in their movement. Moreover, said wall has been reinforced adjacent its junction with said members so as to prevent undue localized stresses at these junctions. Additionally, an expansion joint has been provided with means to insure that it is properly expanded when installed, and with means to protect its bearing surfaces from foreign matter, and with means which avoid the necessity of the fluid-tight joints being ever interfered with during installation and removal of the joint.

While the embodiment of the invention illustrated on the drawings has been described with considerable particularity, it is to be expressly understood that the invention is not restricted thereto, as the same is capable of receiving a variety of mechanical expressions some of which will now readily suggest themselves to those skilled in the art, while changes may be made in the details of construction, arrangement and proportion of parts, and certain features used without other features thereof, without departing from the spirit of this invention. Reference is therefore to be had to the appended claims for a definition of said invention.

What is claimed is:—

1. An expansion joint including relatively telescopic members adapted to enter one inside of the other and to be connected to pipe ends, an expansible and collapsible tubular wall within said telescopic members and having fluid-tight joints at its opposite ends with said members, and means to prevent a torsional stress from being exerted on said wall.

2. An expansion joint including a pair of tubular members adapted to have relatively telescopic movement one inside of the other, an expansible and collapsible tubular wall within said tubular members, means for fixedly attaching the ends of said wall to said members to form fluid-tight joints therewith, and cooperating means on said members to prevent the twisting of said members with respect to each other.

3. An expansion joint comprising a pair of tubular members having end portions which telescope one inside of the other, means securing said end portions against relative movement around their common axis while leaving them free to move relatively in a longitudinal direction, and an expansible and collapsible tubular wall having its opposite ends secured with fluid tight joints to said tubular members.

4. An expansion joint including a pair of tubular members adapted to telescope one inside of the other, an expansible and collapsible tubular wall within said tubular members and having its opposite ends secured to said members to form fluid-tight joints therewith, and means between the overlapping ends of said members to prevent a torsional stress from being exerted on said wall.

5. An expansion joint including a pair of tubular members adapted to telescope one inside of the other, an expansible and collapsible tubular wall within said tubular members and having its opposite ends secured to said members to form fluid-tight joints therewith, and means between the overlapping ends of said members to limit the extent of their telescopic movement.

6. An expansion joint including a pair of tubular members adapted to telescope one inside of the other, an expansible and collapsible tubular wall within said tubular members and having its opposite ends secured to said members to form fluid-tight joints therewith, and means between the overlapping ends of said members for guiding the telescopic movement of the same.

7. An expansion joint including a pair of tubular members adapted to telescope one inside of the other, one of said members being provided with one or more slots and the other of said members being provided with one or more pins each having a sliding fit in its corresponding slot, and an expansible and collapsible tubular wall within said tubular members and having its opposite ends secured to said members to form fluid-tight joints therewith.

8. An expansion joint including a pair of tubular members adapted to telescope one inside of the other, a pin and slot connection between the overlapping ends of said members to prevent the relative twisting of said members, and an expansible and collapsible tubular wall within said tubular members and having its opposite ends secured to said members to form fluid-tight joints therewith.

9. An expansion joint including a pair of tubular members adapted to telescope one inside of the other, spaced bearing surfaces on one of said members engaging the other of said members to guide their relative movement, and an expansible and collapsible tubular wall within said tubular members and having its opposite ends secured to said members to form fluid-tight joints therewith.

10. An expansion joint including a pair of tubular members adapted to telescope one inside of the other, spaced bearing surfaces on one of said members engaging the other of said members to guide their relative movement, means between said members to prevent the relative twisting of the same, and an expansible and collapsible tubular wall within said tubular members and having its opposite ends secured to said members to form fluid-tight joints therewith.

11. An expansion joint including a pair of members adapted to have relative movement in the direction of their axes, an expansible and collapsible corrugated tubular wall having its opposite ends secured to said members to form fluid-tight joints therewith, and wall sections at each end of said wall forming an additional ply for each corrugation to prevent flexure of the same where said wall is secured to said members.

12. As an article of manufacture, an expansion joint including a pair of members adapted to have relative movement in the direction of their axes, an expansible and collapsible tubular wall having its opposite ends secured to said members to form fluid-tight joints therewith, and a removable member interposed between said first-named members to hold said wall expanded until said joint has been installed in a pipe line.

13. As an article of manufacture, an expansion joint including a pair of flanged telescopic members, an expansible and collapsible tubular wall having its opposite ends secured to said members to form fluid-tight joints therewith, and a removable sleeve interposed between said flanges to hold said members extended and said wall expanded until said joint has been installed in a pipe line.

14. As an article of manufacture, an expansion joint including a pair of telescopic members, an expansible and collapsible tubular wall having its opposite ends secured to said members to form fluid-tight joints therewith, and a removable member enclosing the telescoping surfaces of said first-named members to protect the same during installation of said joint.

15. As an article of manufacture an expansion joint including a pair of telescopic members, an expansible and collapsible tubular wall having its opposite ends secured to said members to form fluid-tight joints therewith, and a removable member interposed between said first-named members to hold said members extended and said wall expanded, said member also forming a protecting cover for the telescoping surfaces of said members.

16. As an article of manufacture, an expansion joint including tubular members adapted to have relative movement in the direction of their axes, an expansible and collapsible tubular wall within said members and having its opposite ends secured to said members to form fluid-tight joints therewith, and cooperating means on said members to prevent said members exerting torsion on said wall.

In testimony whereof I have signed this specification.

JEAN V. GIESLER.